United States Patent
Sakuma et al.

(10) Patent No.: US 10,502,106 B1
(45) Date of Patent: Dec. 10, 2019

(54) ELECTROCHEMICAL REACTOR

(71) Applicant: TOYOTA JIDOSHA KABUSHIKI KAISHA, Toyota-shi, Aichi-ken (JP)

(72) Inventors: Tetsuya Sakuma, Gotemba (JP); Keishi Takada, Ashigarakami-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/412,731

(22) Filed: May 15, 2019

(30) Foreign Application Priority Data

Jun. 5, 2018  (JP) ................................ 2018-107584

(51) Int. Cl.
| | |
|---|---|
| *F01N 3/022* | (2006.01) |
| *B01D 53/32* | (2006.01) |
| *B01D 53/92* | (2006.01) |
| *F01N 3/20* | (2006.01) |
| *F01N 5/02* | (2006.01) |
| *F01N 3/08* | (2006.01) |

(52) U.S. Cl.
CPC ......... *F01N 3/0222* (2013.01); *B01D 53/326* (2013.01); *B01D 53/92* (2013.01); *F01N 3/0892* (2013.01); *F01N 3/2073* (2013.01); *F01N 5/025* (2013.01); *B01D 2258/01* (2013.01); *F01N 2240/00* (2013.01)

(58) Field of Classification Search
None
See application file for complete search history.

(56) References Cited

U.S. PATENT DOCUMENTS

2009/0173623 A1 * 7/2009 Kato .................. F01N 3/01
204/270

FOREIGN PATENT DOCUMENTS

| JP | S61-078421 A | 4/1986 |
|---|---|---|
| JP | 2003-047827 A | 2/2003 |

* cited by examiner

*Primary Examiner* — Jelitza M Perez
(74) *Attorney, Agent, or Firm* — Oliff PLC (57) ABSTRACT

An electrochemical reactor arranged in an exhaust passage of an internal combustion engine has a honeycomb member wherein a plurality of cells are formed. The honeycomb comprising an upstream and a downstream side partial honeycombs. The upstream side has a plurality of first and second cells arranged to at least partially adjoin the first cells through partition wall base members including an ion conductive solid electrolyte. The downstream side has a plurality of third and fourth cells arranged to at least partially adjoin the third cells through partition wall base members including an ion conductive solid electrolyte. The first and fourth cells have cathode layers, and second and third cells have anode layers. The electrochemical reactor is configured so all of the exhaust gas flowing through the first cells flows into the third cells and all of the exhaust gas flowing through the second cells flows into the fourth cells.

4 Claims, 7 Drawing Sheets

ELECTROCHEMICAL REACTOR

FIELD

The present invention relates to an electrochemical reactor arranged in an exhaust passage of an internal combustion engine.

BACKGROUND

Known in the past has been an electrochemical reactor provided with an ion conductive solid electrolyte and an anode layer and a cathode layer provided on a surface of the solid electrolyte (for example, PTLs 1, 2). In such an electrochemical reactor, by applying current through the anode layer and the cathode layer, it is possible to remove the $NO_X$ in the exhaust gas on the cathode layer.

As such an electrochemical reactor, there is known one provided with a honeycomb member including a solid electrolyte and providing each cell of the honeycomb member with anode layers or cathode layers (for example, PTL 1). In particular, in the electrochemical reactor described in PTL 1, one cell among two adjoining cells is provided with anode layers while the other cell is provided with cathode layers.

CITATION LIST

Patent Literature

[PTL 1] JP S61-078421 A
[PTL 2] JP 2003-047827 A

SUMMARY

Technical Problem

As explained above, $NO_X$ in exhaust gas is removed on the cathode layers. Therefore, in an electrochemical reactor configured to be provided with a honeycomb member as explained above, the $NO_X$ in the exhaust gas flowing through a cell, in which only an anode layer is provided, is not removed. Accordingly, the $NO_X$ in the exhaust gas cannot be suitably removed.

The present invention was made in consideration of the above technical problem and has as its object to enable $NO_X$ to be suitably removed in an electrochemical reactor provided with a honeycomb member.

Solution to Problem

The present invention was made so as to solve the above problem and has as its gist the following.

(1) An electrochemical reactor arranged in an exhaust passage of an internal combustion engine, wherein
the electrochemical reactor comprises a honeycomb member at which a plurality of cells are formed, the honeycomb member comprising an upstream side partial honeycomb member and a downstream side partial honeycomb member arranged at a downstream side from the upstream side partial honeycomb member in the direction of exhaust flow;
the upstream side partial honeycomb member comprises a plurality of first cells and a plurality of second cells arranged so as to at least partially adjoin the first cells through partition wall base members including an ion conductive solid electrolyte, a cathode layer being provided on the surface of the partition wall base members defining the first cells and an anode layer being provided on the surface of the partition wall base member defining the second cells;
the downstream side partial honeycomb member comprises a plurality of third cells and a plurality of fourth cells arranged so as to at least partially adjoin the third cells through partition wall base members including an ion conductive solid electrolyte, an anode layer being provided on the surface of the partition wall base members defining the third cells and a cathode layer being provided on the surface of the partition wall base members defining the fourth cells; and
the electrochemical reactor is configured so that all of the exhaust gas flowing through the first cells flows into the third cells and all of the exhaust gas flowing through the second cells flows into the fourth cells.

(2) The electrochemical reactor according to above (1), wherein
the upstream side partial honeycomb member and the downstream side partial honeycomb member are joined together at the partition wall base members, and
the cathode layer of the first cell and the anode layer of the third cell are arranged so as to be separated from each other in the direction of exhaust flow so as not to contact each other and the anode layer of the second cell and the cathode layer of the fourth cell are arranged so as to be separated from each other in the direction of exhaust flow so as not to contact each other.

(3) The electrochemical reactor according to above (1) or (2), wherein the honeycomb member comprises spacers formed by a material with a lower ion conductivity compared with the solid electrolyte, between the upstream side partial honeycomb member and the downstream side partial honeycomb member.

(4) The electrochemical reactor according to any one of above (1) to (3), wherein the cells of the honeycomb member are configured to have rectangular shape cross-sections, and the honeycomb member is formed so that one first cell adjoins four second cells in the four directions and one second cell adjoins four first cells in the four directions, and is formed so that one third cell adjoins four fourth cells in the four directions and one fourth cell adjoins four third cells in the four directions.

Advantageous Effects of Invention

According to the present invention, it is possible to suitably remove $NO_X$ in an electrochemical reactor provided with a honeycomb member.

DESCRIPTION OF EMBODIMENT

Below, referring to the drawings, embodiments of the present invention will be explained in detail. Note that, in the following explanation, similar component elements are assigned the same reference numerals.

First Embodiment

<<Explanation of Internal Combustion Engine as a Whole>>

Figure 1:
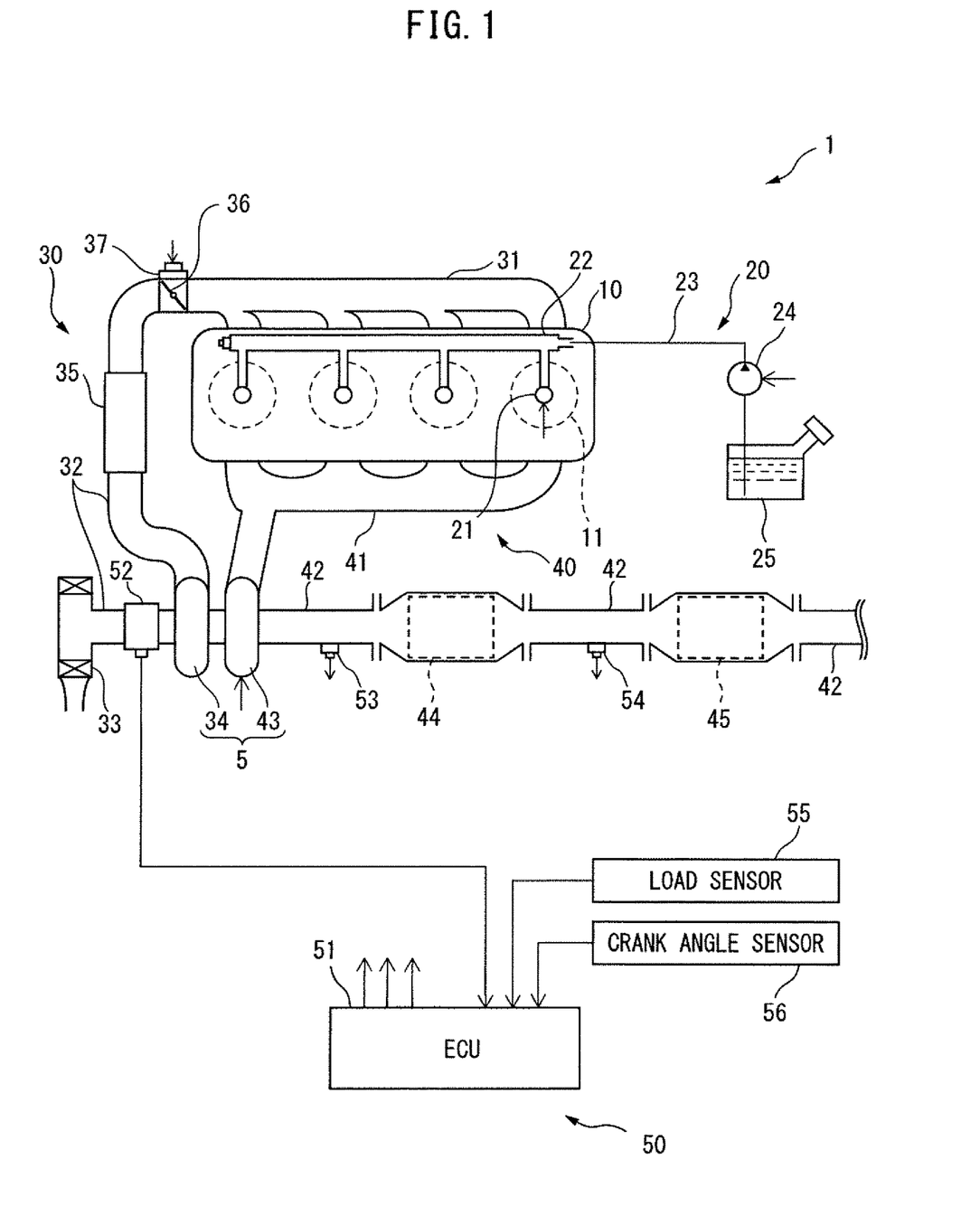
FIG. 1 is a schematic view of the configuration of an internal combustion engine.

First, referring to FIG. 1, the configuration of an internal combustion engine 1 mounting an electrochemical reactor according to first embodiment will be explained. FIG. 1 is a schematic view of the configuration of the internal combustion engine 1. As shown in FIG. 1, the internal combustion engine 1 is provided with an engine body 10, fuel feed system 20, intake system 30, exhaust system 40 and control device 50.

The engine body 10 is provided with a cylinder block in which a plurality of cylinders 11 are formed, a cylinder head and a crank case. A piston 14 is arranged in each cylinder 11, and each cylinder 11 is connected to intake ports and exhaust port.

The fuel feed system 20 is provided with fuel injectors 21, a delivery pipe 22, fuel feed pipe 23, fuel pump 24, and fuel tank 25. Each fuel injector 31 is arranged in the cylinder head so as to directly inject fuel into each cylinder 11. The fuel pumped out by the fuel pump 24 is supplied through the fuel feed pipe 23 to the delivery pipe 22, and then is injected from the fuel injector 21 into the cylinder 11.

The intake system 30 is provided with an intake manifold 31, intake pipe 32, air cleaner 33, compressor 34 of a turbocharger 5, intercooler 35, and throttle valve 36. The intake port of each cylinder 11 is communicated through the intake manifold 31 and the intake pipe 32 with the air cleaner 33. The intake pipe 32 is provided with the compressor 34 of the exhaust turbocharger 5 for compressing and discharging intake air, and the intercooler 35 for cooling the air compressed by the compressor 34. The throttle valve 36 is driven so as to be opened and closed, by a throttle valve drive actuator 37.

The exhaust system 40 is provided with an exhaust manifold 41, exhaust pipe 42, turbine 43 of the exhaust turbocharger 5, exhaust purification catalyst 44, and electrochemical reactor (hereinafter, simply referred to as "reactor") 45. The exhaust port of each cylinder 11 is communicated through the exhaust manifold 51 and the exhaust pipe 52 with the exhaust purification catalyst 44, and the exhaust purification catalyst is communicated through the exhaust pipe 42 with the electrochemical reactor 45. The exhaust purification catalyst 44 is, for example, a three-way catalyst or NOx storage reduction catalyst, and purify composition in the exhaust gas, such as NOx or unburned HC when the temperature thereof is equal to or greater than a constant activation temperature. In the exhaust pipe 42, the turbine 43 of the exhaust turbocharger 5, which is driven to rotate by the energy of the exhaust gas, is provided. Note that the exhaust purification catalyst 44 may be provided downstream side of the reactor 45 in the flow direction of the exhaust gas.

The control device 50 is provided with an electronic control unit (ECU) 51 and various types of sensors. The sensors includes, for example, a flow rate sensor 52 for detecting the flow rate of air flowing through the intake pipe 32, an air-fuel ratio sensor 53 for detecting the air-fuel ratio of the exhaust gas, a $NO_X$ sensor 54 for detecting the $NO_X$ concentration of the exhaust gas flowing into the reactor 45. These sensors are connected to ECU. Further, the ECU 51 is connected to the actuators controlling the operation of the internal combustion engine 1. In the example shown in FIG. 1, the ECU51 is connected to the fuel injectors 21, fuel pump 24 and throttle valve drive actuator 37 and controls these actuators.

<<Configuration of Electrochemical Reactor>>

Figure 2:
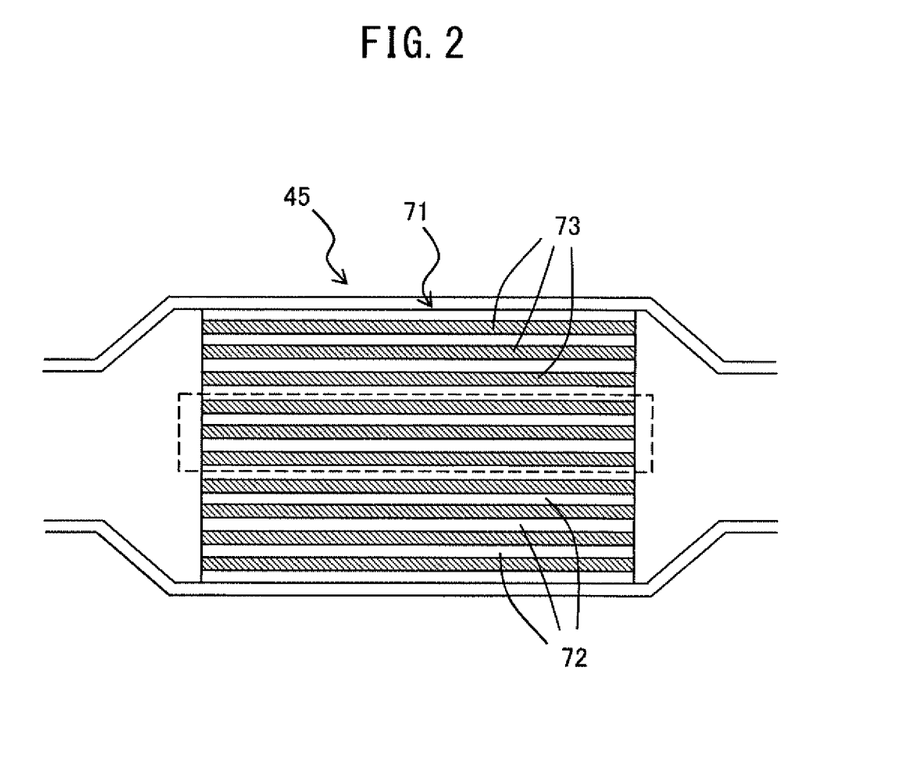
FIG. 2 is a cross-sectional side view of an electrochemical reactor.

Next, referring to FIGS. 2 to 4, the configuration of the reactor 45 according to the present embodiment will be explained. FIG. 2 is a cross-sectional side view of the reactor 45. As shown in FIG. 2, the reactor 45 is provided with honeycomb member 71 forming a plurality of cells 72. The honeycomb member 71 is provided with a plurality of partition walls 73, and a plurality of cells 72 are defined by the partition walls. Each cell 72 is formed so as to extend in the axial direction of the honeycomb member 71 (i.e., in the flow direction of the exhaust gas flowing through the reactor 45), and have a square cross-section. The partition walls 73 are comprised of a plurality of first partition walls extending in parallel with each other and a plurality of second partition walls extending in parallel with each other and perpendicular to the first partition walls. The cells 72 are defined by these first partition walls and second partition walls, and extend in parallel to each other. The exhaust gas flowing into the reactor 45 flows through the plurality of cells 72.

Figure 3:
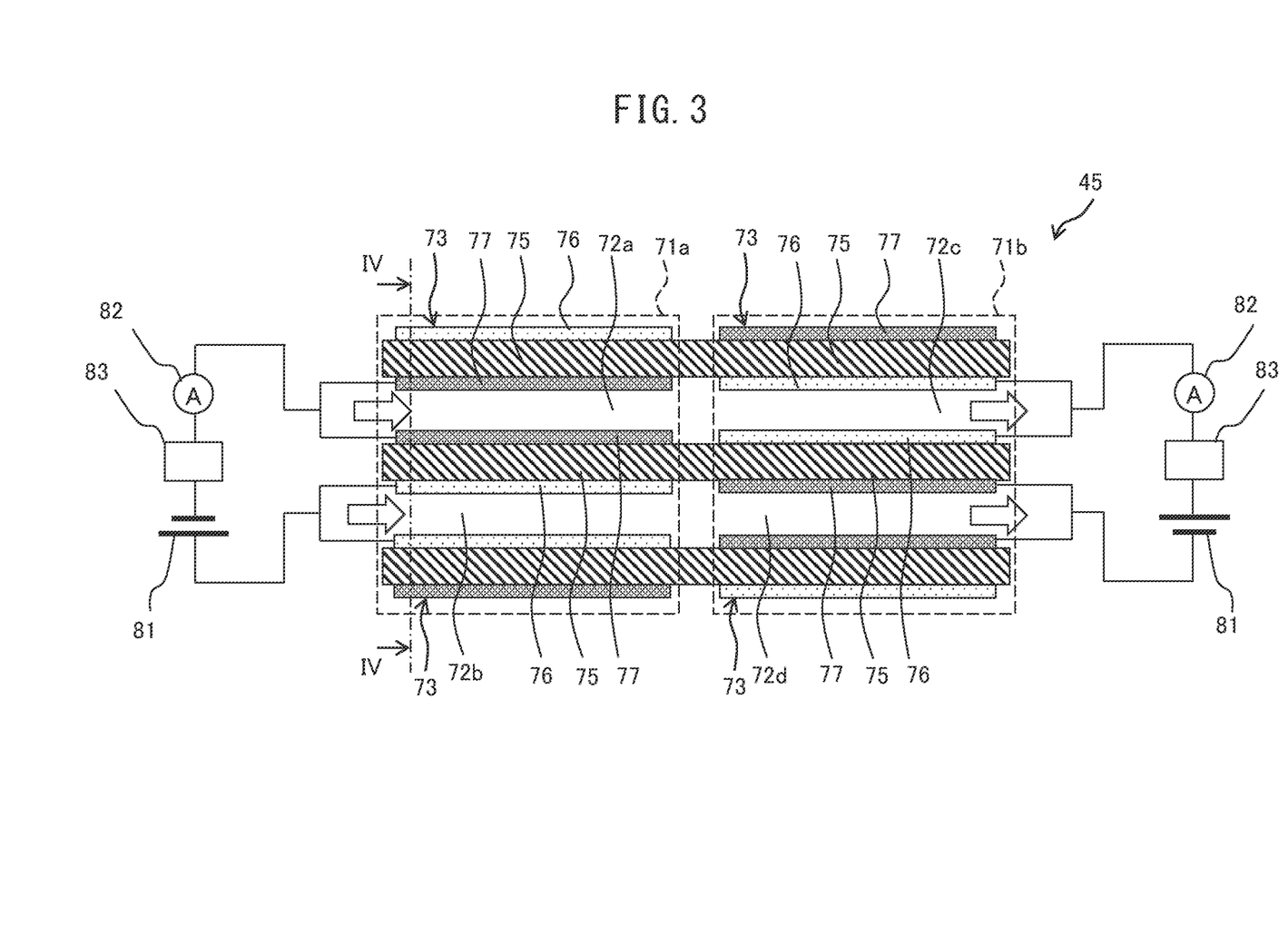
FIG. 3 is an enlarged cross-sectional view schematically showing a region shown by broken lines in FIG. 2.

FIG. 3 is an enlarged cross-sectional view schematically showing a region shown by broken lines in FIG. 2. The arrows in FIG. 3 indicates the direction of the exhaust gas flowing through reactor 45. As shown in FIG. 3, the honeycomb member 71 is provided with an upstream side partial honeycomb member 71a and a downstream side partial honeycomb member 71b. The downstream side partial honeycomb member 71b is positioned downstream of the upstream side partial honeycomb member 71a in the flow direction of the exhaust gas (the direction of the arrow in FIG. 3).

The partition wall 73 of the upstream side partial honeycomb member 71a is provided with partition wall base members 75 defining the cells formed in the upstream side partial honeycomb member 71a, an anode layer 76 arranged on one surface of the partition wall base members 75, and a cathode layer 77 arranged on the surface of the partition wall base members 75 at the opposite side to the surface at which the anode layer 76 is arranged.

The partition wall base member 75 includes a porous solid electrolyte having proton conductivity. As the solid electrolyte, for example, a perovskite type metal oxide $MM'_{1-x}R_xO_{3-\alpha}$ (M=Ba, Sr, Ca, M'=Ce, Zr, R=Y, Yb, for example, $SrZr_xYb_{1-x}O_{3-\alpha}$, $SrCeO_3$, $BaCeO_3$, $CaZrO_3$, $SrZrO_3$, etc.), a phosphate (for example, $SiO_2$—$P_2O_5$-based glass, etc.), metal doped $Sn_xIn_{1-x}P_2O_7$ (for example, $SnP_2O_7$, etc.) or zeolite (for example, ZSM-5) are used.

The anode layer 76 and the cathode layer 77 both include Pt, Pd, Rh, or other precious metals. Further, the anode layer 76 includes a substance able to hold (that is, able to adsorb and/or absorb) water molecules. Specifically, the substance able to hold water molecules includes zeolite, silica gel, activated alumina, etc. On the other hand, the cathode layer 77 includes a substance able to hold (that is, able to adsorb and/or absorb) $NO_X$. Specifically, the substance able to hold $NO_X$ includes K, Na, or another alkali metal, Ba or another alkali earth metal, La or another rare earth, etc.

Figure 4:
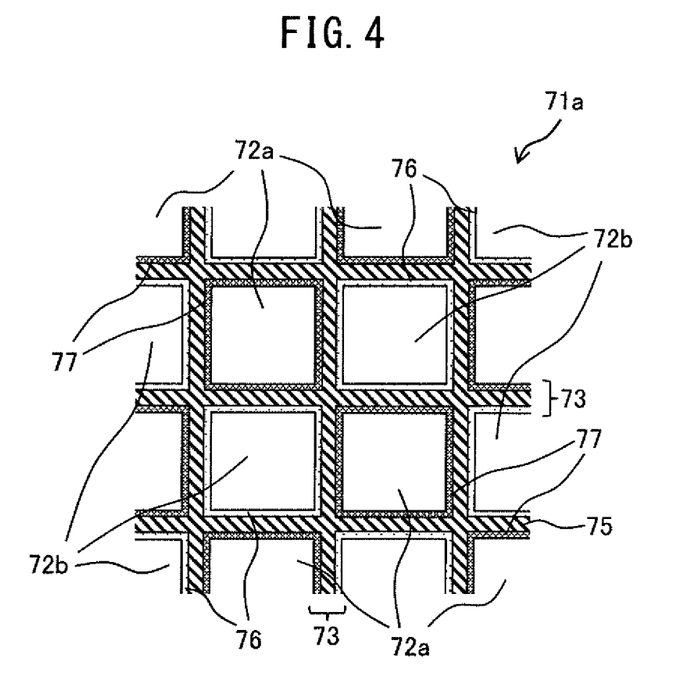
FIG. 4 is an enlarged cross-sectional view of an upstream side partial honeycomb member seen along the line IV-IV of FIG. 3.

FIG. 4 is an enlarged cross-sectional view of an upstream side partial honeycomb member 71a seen along the line IV-IV of FIG. 3. As will be understood from FIGS. 3 and 4, the cells 72 of the upstream side partial honeycomb member 71a include a plurality of first cells 72a and a plurality of second cells 72b arranged so as to adjoin the first cells 72a through partition walls 73 (partition wall base members 75).

As will be understood from FIG. 4, in the present embodiment, the cells 72 of the upstream side partial honeycomb member 71a are formed so as to have square shaped cross-sections. The upstream side partial honeycomb member 71a is formed so that one first cell 72a adjoins four second cells 72b in the four directions through partition walls 73 and so that one second cell 72b adjoins four first cells 72a in the four directions through partition walls 73. That is, the upstream side partial honeycomb member 71a is formed so that the first cells 72a and the second cells 72b are alternately arranged.

Among the anode layers 76 and the cathode layers 77, only the cathode layers 77 are provided on the surfaces of the partition wall base members 75 defining the first cells 72a. As will be understood from FIG. 4, the cathode layers 77 are provided on the surfaces of all of the partition wall base members 75 forming the four sides defining the rectangular cross-section shaped first cells 72a. Therefore, the first cells 72a are formed so as to be surrounded by the cathode layers 77.

On the other hand, among the anode layers 76 and the cathode layers 77, only the anode layers 76 are provided on the surfaces of the partition wall base members 75 defining the second cells 72b. As will be understood from FIG. 4, the anode layers 76 are provided on the surfaces of all of the partition wall base members 75 forming the four sides defining the rectangular cross-sectional shaped second cells 72b. Therefore, the second cells 72a are formed so as to be surrounded by the anode layers 76.

In the upstream side partial honeycomb member 71a configured in this way, one of two adjoining cells 72 is a first cell 72a, while the other is a second cell 72b. Therefore, a partition wall 73 provided between two adjoining cells 72 of the upstream side partial honeycomb member 71a is comprised of an anode layer 76, a partition wall base member 75 including a solid electrolyte, and a cathode layer 77 stacked in that order.

The downstream side partial honeycomb member 71b is configured in the same way as the upstream side partial honeycomb member 71a. Therefore, the partition walls 73 of the downstream side partial honeycomb member 71b are also provided with partition wall base members 75, anode layers 76, and cathode layers 77. Further, as will be understood from FIG. 3, the cells 72 of the downstream side partial honeycomb member 71b include a plurality of third cells 72c and a plurality of fourth cells 72d arranged so as to adjoin the third cells 72c through partition walls 73 (partition wall base members 75).

The cells 72 of the downstream side partial honeycomb member 71b also, in the same way as the cells 72 of the upstream side partial honeycomb member 71a, are formed so as to have square shape cross-sections. The downstream side partial honeycomb member 71b is formed so that one third cell 72c adjoins four fourth cells 72d in the four directions through partition walls 73 and so that one fourth cell 72d adjoins four third cells 72c in the four directions through partition walls 73. That is, the downstream side partial honeycomb member 71b is formed so that the third cells 72c and the fourth cells 72d are alternately arranged.

Among the anode layers 76 and the cathode layers 77, only the anode layers 76 are provided on the surfaces of the partition wall base members 75 defining the third cells 72c. Therefore, the anode layers 76 are provided on the surfaces of all of the partition wall base members 75 forming the four sides defining the rectangular cross-sectional shaped third cells 72c. Therefore, the third cells 72e are formed so as to be surrounded by the anode layers 76.

On the other hand, among the anode layers 76 and the cathode layers 77, only the cathode layers 77 are provided on the surfaces of the partition wall base members 75 defining the fourth cells 72d. Therefore, the cathode layers 77 are provided on the surfaces of all of the partition wall base members 75 forming the four sides defining the rectangular cross-section shape fourth cells 72d. Therefore, the fourth cells 72d are formed so as to be surrounded by the cathode layers 77.

In the downstream side partial honeycomb member 71b configured in this way, one of two adjoining cells 72 is a third cell 72c, while the other is a fourth cell 72d. Therefore, a partition wall provided between two adjoining cells 72 of the downstream side partial honeycomb member 71b is comprised of an anode layer 76, a partition wall base member 75 including a solid electrolyte, and a cathode layer 77 stacked in that order.

In the present embodiment, the upstream side partial honeycomb member 71a and the downstream side partial honeycomb member 71b are joined together at the partition wall base members 75. Specifically, the downstream side end faces of the partition wall base members 75 of the upstream side partial honeycomb member 71a and the upstream side end faces of the partition wall base members 75 of the downstream side partial honeycomb member 71b are joined together. In particular, in the present embodiment, the partition wall base members 75 of the honeycomb member 71 are formed integrally without being split between the upstream side part and the downstream side part.

Further, the upstream side partial honeycomb member 71a and the downstream side partial honeycomb member 71b are joined together so that the first cells 72a and the third cells 72c communicate and the second cells 72b and the fourth cells 72d communicate. In particular, in the present embodiment, the upstream side partial honeycomb member 71a and the downstream side partial honeycomb member 71b are similarly formed except for the configurations of the anode layers 76 and the cathode layers 77. Therefore, the upstream side partial honeycomb member 71a and the downstream side partial honeycomb member 71b are joined so that one first cell 72a communicates with one third cell 72c and so that one second cell 72b communicates with one fourth cell 72d. Whatever the case, in the reactor 45 of present embodiment, all of the exhaust gas flowing through the first cells 72a flows into the third cells 72c and all of the exhaust gas flowing through the second cells 72b flows into the fourth cells 72d.

Further, the reactor 45 is provided with a power system 81, ammeter 82 and current adjustment system 83. The positive electrode of the power system 81 is connected to the anode layer 76, while the negative electrode of the power system 81 is connected to the cathode layer 77.

The current adjustment system 83 is configured to be able to change the magnitude of the current provided to the reactor 45 so as to flow from anode layer 76 through the partition wall base members 75 to the cathode layer 77. Further, the current adjustment system 83 is configured to be able to change the voltage applied across the anode layer 76 and the cathode layer 77.

The power system 81 is connected to the ammeter 82 in series. Further, the ammeter 82 is connected 58 to the ECU51, and send the detected value of electrical current to the ECU51. Further, the current adjustment system 83 is connected to the ECU 51, and is controlled by the ECU 51. In the present embodiment, the current adjustment system 83 is controlled so that the current value detected by the ammeter 82 becomes a target value.

Note that, in the example shown in FIG. 3, the anode layers 76 and the cathode layers 77 of the upstream side partial honeycomb member 71a, and the anode layers 76 and the cathode layers 77 of the downstream side partial honeycomb member 71b are connected to separate power devices 81, ammeters 82, and current regulators 83. However, the anode layers 76 and the cathode layers 77 of the upstream side partial honeycomb member 71a and the anode layers 76 and the cathode layers 77 of the downstream side partial honeycomb member 71b may also be connected to a single common power device 81, ammeter 82, and current regulator 83.

<<Purification by Reactor>>

Figure 5:
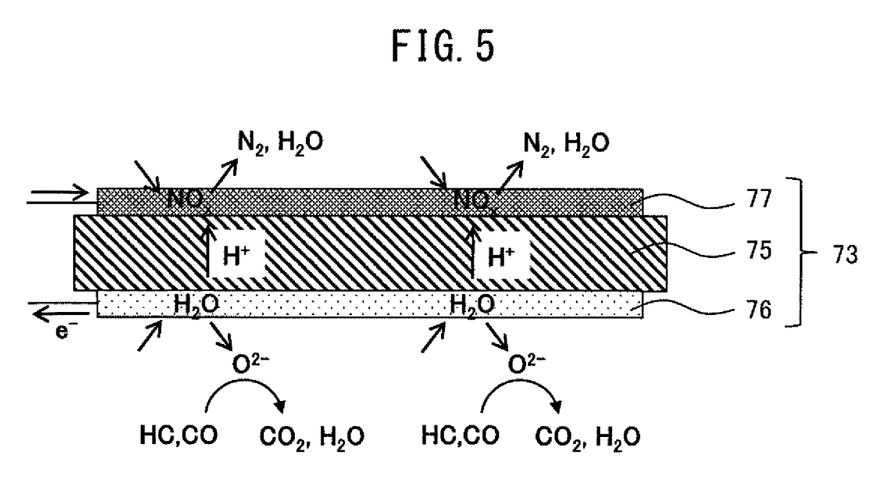
FIG. 5 is a view schematically showing a reaction occurring at partition walls of the honeycomb member.

Referring to FIG. 5, the reactions occurring at the reactor 45 configured as explained above will be explained. FIG. 5 is a view schematically showing the reactions occurring at the partition walls 73 of the honeycomb member 71. At the reactor 45, if current flows from the power device 81 to the anode layers 76 and the cathode layers 77, reactions such as in the following formulas occur at the anode layers 76 and the cathode layers 77:

Anode side: $H_2O \rightarrow 2H^+ + O^{2-}$ (1)

$2HC + 3O^{2-} \rightarrow H_2O + CO_2 + 6e$ (2)

$CO + O^{2-} \rightarrow CO_2 + 2e$ (3)

Cathode side: $2NO + 4H^+ + 4e \rightarrow N_2 + 2H_2O$ (4)

That is, at the anode layers 76, the water molecules held at the anode layers 76 are electrolyzed whereby oxygen ions and protons are produced. When the exhaust gas contains unburned HC or CO, etc., the produced oxygen ions react with the HC or CO whereby carbon dioxide and water is produced. On the other hand, the protons produced at the anode layers 76 move through the partition wall base members 75 containing the proton conductive solid electrolyte from the anode layers 76 to the cathode layers 77. At the cathode layers 77, the NO held at the cathode layers 77 reacts with the protons and electrons whereby nitrogen and water molecules are produced. Note that, when there is no HC or CO present around the anode layers 76, a reaction such as shown in the following formula (5) occurs whereby oxygen is produced. The produced oxygen is released into the exhaust gas.

$2H_2O \rightarrow 4H^+ + O_2 + 4e$ (5)

As stated above, according to the present embodiment, by making current flow from the power system 81 of the reactor 45 to the anode layer 76 and the cathode layer 77, it is possible to reduce the NO in the exhaust gas to $N_2$ to remove it. In addition, in the present embodiment, HC, CO in the exhaust gas can be oxidized and removed by applying an electrical current from the power system of the reactor 45.

Note that, the anode layer 76 may include two layers of a conductive layer including a precious metal having electroconductivity and a water molecule holding layer including a substance able to hold water molecules. In this case, the conductive layer is arranged on the surface of the partition wall base member 75, while the water molecule holding layer is arranged on the surface of the conductive layer at the opposite side from the partition wall base member 75 side.

Similarly, the cathode layer 77 may include two layers of a conductive layer including a precious metal having electroconductivity and an $NO_X$ holding layer including a substance able to hold $NO_X$. In this case, the conductive layer is arranged on the surface of the partition wall base member 75, while the $NO_X$ holding layer is arranged on the surface of the conductive layer at the opposite side from the partition wall base member 75 side.

Further, in the present embodiment, the partition wall base members 75 of the reactor 45 contain proton conductive solid electrolyte. However, the partition wall base members 75 may also be configured so as to include an oxygen ion conductive solid electrolyte or other ion conductive solid electrolyte, instead of a proton conductive solid electrolyte.

Furthermore, in the present embodiment, the cells 72 are formed so as to be rectangular in cross-sectional shapes. However, the cells 72 may also be formed so as to be shapes with cross-sectional shapes different from rectangular shapes, for example, hexagonal shapes or octagonal shapes. However, in this case, some of the adjoining cells 72 will have only the anode layers 76 or only the cathode layers 77. Between such adjoining cells 72, no movement of ions passing through the partition wall base members 75 will occur. Accordingly, the $NO_X$ and other components cannot be removed.

Note that, if expressing these states together, the first cells 72a and the second cells 72b of the upstream side partial honeycomb member 71a can be said to be arranged so as to at least partially adjoin each other through the partition wall base members 75. Similarly, the third cells 72c and the fourth cells 72d of the downstream side partial honeycomb member 71b can be said to be arranged so as to at least partially adjoin each other through the partition wall base members 75.

Advantageous Effects

Figure 6:
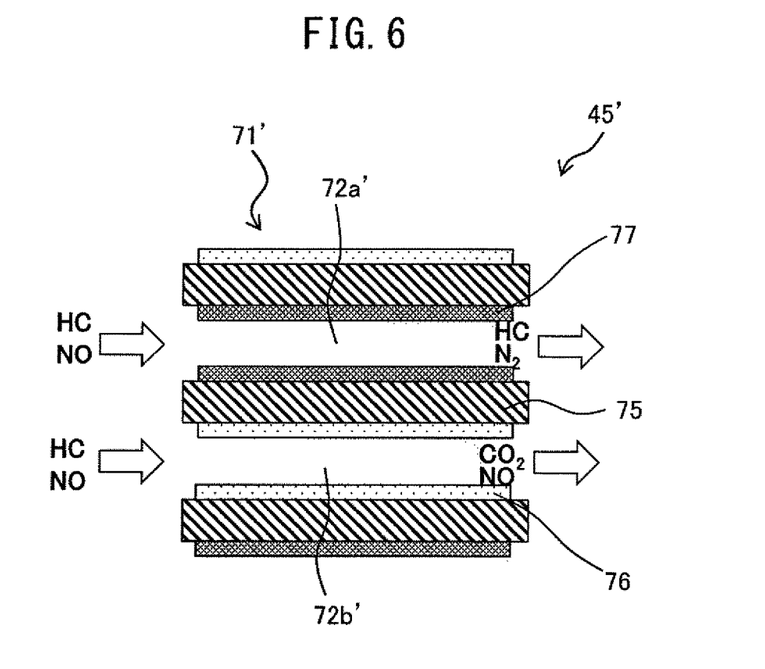
FIG. 6 is a view showing a flow of exhaust gas in a reactor provided with a honeycomb member having a configuration different from the first embodiment.

Next, referring to FIGS. 6 and 7, the advantageous effects due to the reactor 45 according to the first embodiment will be explained. FIG. 6 is a view showing the flow of exhaust gas at a reactor 45' provided with a honeycomb member 71' of a configuration different from the above embodiment. The exhaust gas flows in a direction shown by the arrow in the figure. In the reactor 45' shown in FIG. 6, one cell is configured to have only one of the anode layers and the cathode layers from the upstream end to the downstream end of the honeycomb member 71'.

Specifically, in the honeycomb member 71' shown in FIG. 6, one of two adjoining cells is formed as a first cell 72a' and the other is formed as a second cell 72b'. Further, in the example shown in FIG. 6, only cathode layers 77 are provided on the surfaces of the partition wall base members 75 defining the first cell 72a' of the honeycomb member 71', while only anode layers 76 are provided on the surfaces of the partition wall base members 75 defining the second cell 72b'.

If exhaust gas containing HC, CO, and $NO_X$ flows, as shown by the arrows in FIG. 6, into the reactor 45' configured as shown in FIG. 6, exhaust gas containing HC, CO, and $NO_X$ flows into the first cell 72a' and the second cell 72b'. The first cell 72a' has the cathode layers 77, and therefore if current flows from the power device 81 to the anode layers 76 and the cathode layers 77, the reaction shown by the above formula (4) is promoted at the first cell 72a', and thus the $NO_X$ in the exhaust gas is removed. However, the first cell 72a' does not have anode layers 76, and therefore even if current flows from the power device 81, the reactions shown in the above formulas (1) to (3) do not occur in the first cell 72a', and thus HC and CO in the exhaust gas are not removed. That is, at the first cell 72a', the $NO_X$ in the exhaust gas is removed, but the HC and CO are not removed and flow out as is from the first cell 72a'.

On the other hand, since the second cell 72b' has the anode layers 76, if current flows from the power device 81 to the anode layers 76 and the cathode layers 77, at the second cell 72b', the reactions shown by the above formulas (1) to (3) will be promoted and thus the HC and CO in the exhaust gas will be removed. However, the second cell 72b' does not have cathode layers 77, and therefore even if current flows from the power device 81, the reaction shown by the above formula (4) will not be promoted at the second cell 72b', and $NO_X$ in the exhaust gas will not be removed. That is, in the second cell 72b', the HC and CO in the exhaust gas will be removed, but the $NO_X$ will not be removed and will flow out from the second cell 72b' as it is. In this way, unlike the above embodiment, in the reactor 45' configured as shown in FIG. 6, the HC, CO, and $NO_X$ in the exhaust gas cannot be sufficiently removed.

Figure 7:
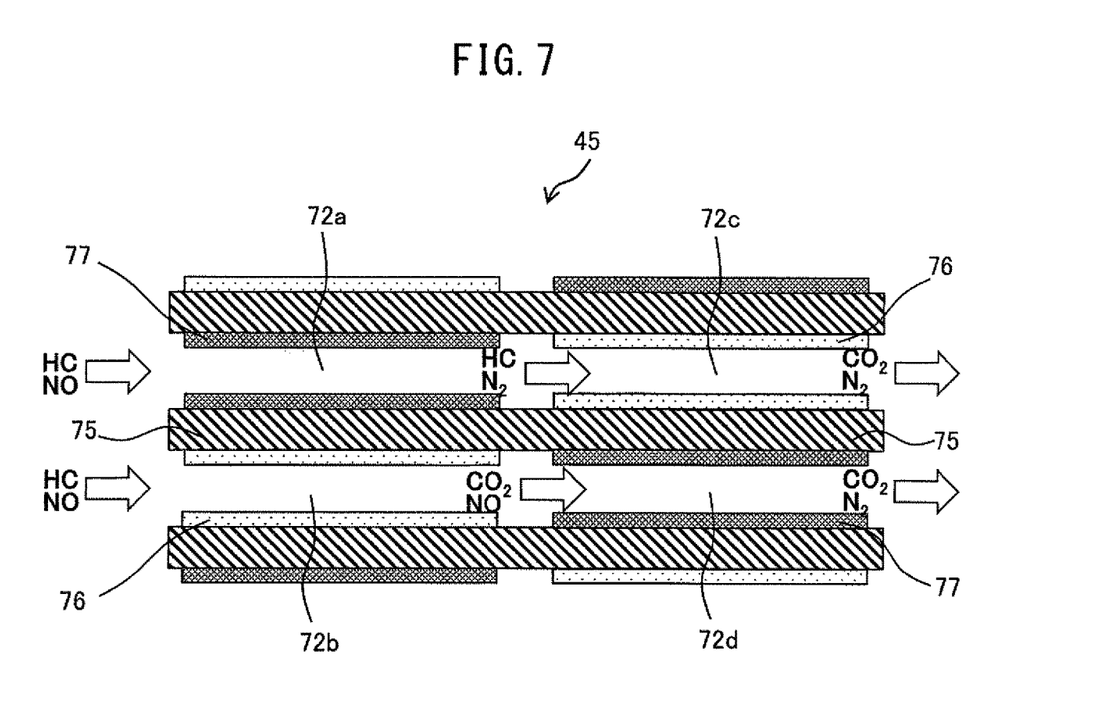
FIG. 7 is a view showing a flow of exhaust gas in a reactor provided with a honeycomb member according to the first embodiment.

FIG. 7 is a view showing the flow of exhaust gas in a reactor 45 provided with the honeycomb member 71 according to the above embodiment. The exhaust gas flows in the direction shown by the arrows in the figure. If exhaust gas containing HC, CO, or $NO_X$ flows into a first cell 72a of the reactor 45 of the configuration of the present embodiment, since the first cell 72a has the cathode layers 77, the $NO_X$ in the exhaust gas is removed. Therefore, exhaust gas containing HC, CO, and $N_2$ flows out from the first cell 72a. If this exhaust gas flows into a third cell 72c, since the third cell 72c has the anode layers 76, the HC and CO in the exhaust gas are removed. As a result, HC, CO, and $NO_X$ are completely removed from the exhaust gas flowing through the first cell 72a and the third cell 72c.

Similarly, if exhaust gas containing HC, CO, or $NO_X$ flows into a second cell 72b, since the second cell 72b has the anode layers 76, the HC or CO in the exhaust gas is removed. Therefore, exhaust gas containing $CO_2$ and NO flows out from the second cell 72b. If this exhaust gas flows into a fourth cell 72d, since the fourth cell 72d has the cathode layers 77, the $NO_X$ in the exhaust gas are removed. As a result, HC, CO, and $NO_X$ are completely removed from the exhaust gas flowing through the second cell 72b and the fourth cell 72d. In this way, according to the reactor 45 of the present embodiment, the HC, CO, and $NO_X$ in the exhaust gas can be completely removed.

Further, in the present embodiment, as shown in FIG. 4, cathode layers 77 are provided over the entire surfaces of the partition wall base members 75 defining the first cell 72a (and the fourth cell 72d). Similarly, anode layers 76 are provided over the entire surfaces of the partition wall base members 75 defining the second cell 72b (and the third cell 72c). Therefore, the cathode layers 77 can be kept from unintentionally being short-circuited with the anode layers 76.

Furthermore, in the present embodiment, the partition walls are formed in a honeycomb manner. Therefore, the contact area between the partition walls, which are provided with the anode layer, partition wall base members and cathode layer, and the exhaust gas can be made as large as possible. As a result, it is possible to raise the purification rate of the exhaust gas.

Second Embodiment

Next, referring to FIGS. 8 and 9, an electrochemical reactor according to a second embodiment will be explained. The configuration of the electrochemical reactor according to the second embodiment is basically similar to the configuration of the electrochemical reactor according to the first embodiment. Therefore, below, mainly parts different from the electrochemical reactor according to the first embodiment will be explained.

Figure 8:
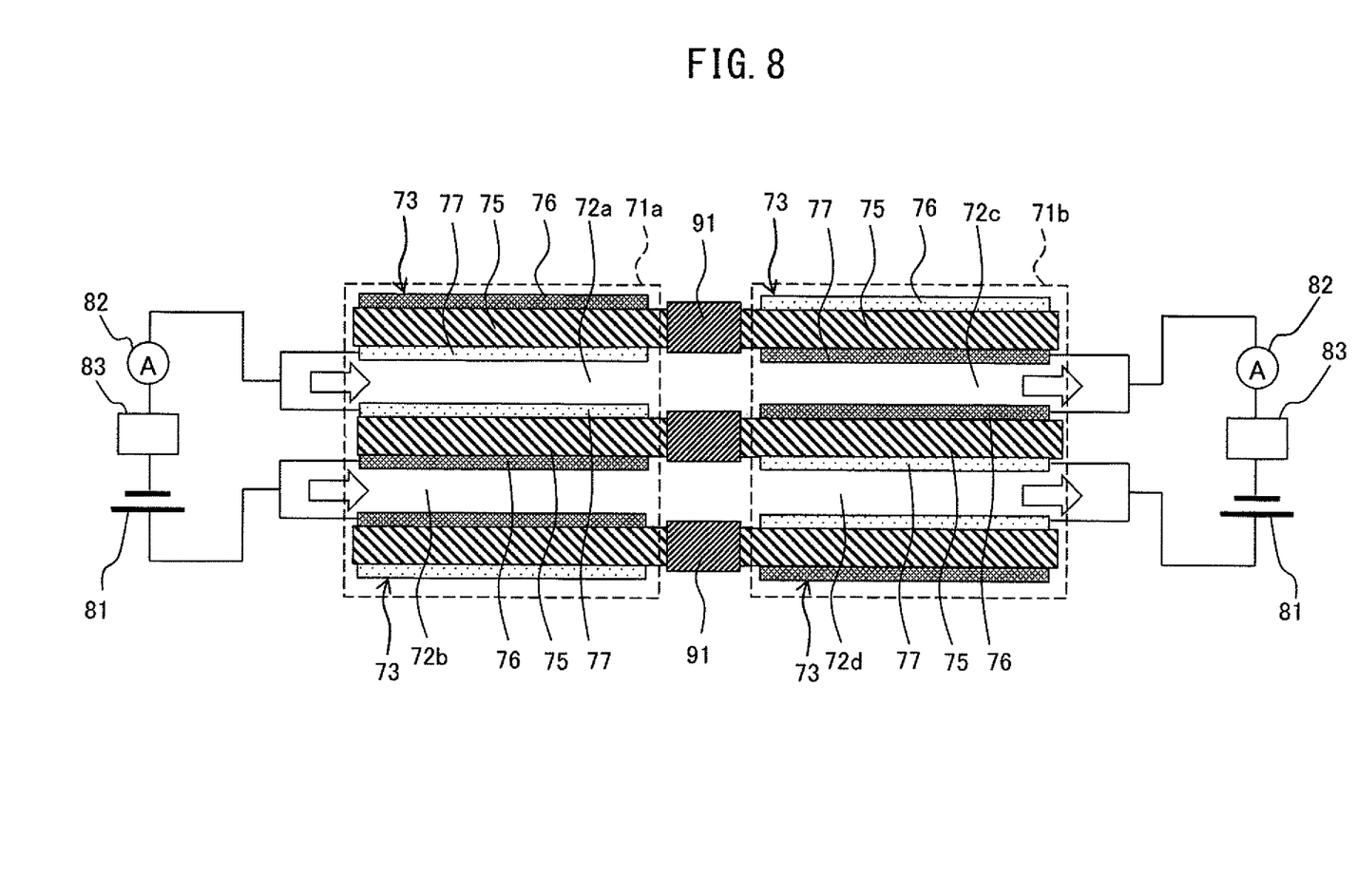
FIG. 8 is an enlarged cross-sectional view, similar to FIG. 3, schematically showing the configuration of a reactor according to a second embodiment.
Figure 9:
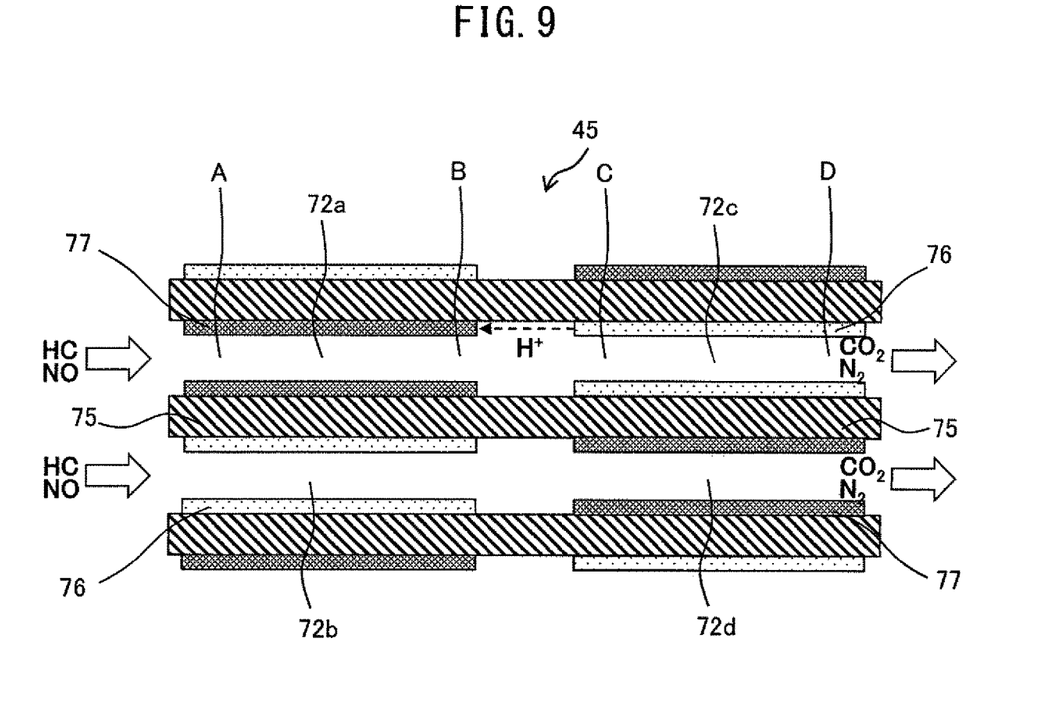
FIG. 9 is a view schematically showing a reactor provided with a honeycomb member according to the first embodiment.

FIG. 8 is an enlarged cross-sectional view, similar to FIG. 3, schematically showing the configuration of a reactor 45 according to the second embodiment. As will be understood from FIG. 8, in the present embodiment, spacers 91 are provided between the upstream side partial honeycomb member 71a and the downstream side partial honeycomb member 71b. Specifically, spacers 91 are provided between the downstream side end faces of the partition wall base members 75 of the upstream side partial honeycomb member 71a and the upstream side end faces of the downstream side partial honeycomb member 71b. The spacers 91 have cross-sectional shapes similar to the upstream side partial honeycomb member 71a and the downstream side partial honeycomb member 71b at the cross-sections perpendicular to the axis of the honeycomb member 71.

Further, the spacers 91 are formed by a material lower in proton conductivity (or ion conductivity) compared with the solid electrolyte of the partition wall base members 75. For example, the spacers 91 are formed by an insulating material. Specifically, the spacers 91 are, for example, formed by alumina, cordierite, etc.

In the present embodiment, by provision of the insulating spacers 91 in this way, movement of protons between the cathode layers 77 of the upstream side partial honeycomb member 71a and the anode layers 76 of the downstream side partial honeycomb member 71b is suppressed. Similarly, movement of protons between the anode layers 76 of the upstream side partial honeycomb member 71a and the cathode layers 77 of the downstream side partial honeycomb member 71b is suppressed.

In this regard, at the reactor 45 according to the first embodiment, at the first cells 72a, a part of the protons may not react with the $NO_X$, but is released into the exhaust gas as hydrogen. The reason will be explained below with reference to FIG. 9. FIG. 9 is a view schematically showing a reactor provided with a honeycomb member according to the first embodiment.

At the first cell 72a, $NO_X$ in the exhaust gas is removed by the above formula (4). Therefore, the concentration of $NO_X$ in the exhaust gas flowing through the first cell 72a is high at the region at the upstream side of the first cell 72a (A in figure), falls further to the downstream side, and becomes lowest at the region at the downstream side (B in figure). In this regard, the speed of the reaction of the above formula (4) becomes faster as the concentration of $NO_X$ becomes higher. Therefore, in the region B at the downstream side of the first cell 72a, the speed of the reaction of the formula (4) is slow.

On the other hand, at the third cell 72c, protons are produced due to the above formulas (1) to (3) and (5). Therefore, the concentration of water vapor, the concentration of HC, and the concentration of CO in the exhaust gas flowing through the third cell 72c are high in the region at the upstream side of the third cell 72c (C in figure), fall further to the downstream side, and become lowest at the region at the downstream side (D in figure). In this regard, the speed of the reaction of the above formulas (1) to (3) and (5) becomes faster, as the concentration of water vapor, the concentration of HC, and the concentration of CO become higher. Therefore, in the region C at the upstream side of the third cell 72c, the speed of the reaction of the formula (4) is fast and accordingly a large amount of protons are produced.

If spacers 91 are not provided, part of the large amount of protons produced in the region C at the upstream side of the third cell 72c passes through the vicinity of the surface of the partition wall base member 75 including the solid electrolyte and moves to the region B at the downstream side of the first cell 72a. However, at the region B at the downstream side of first cell 72a, the speed of the reaction of the above formula (4) is slow. Therefore, part of the protons moving from the third cell 72c to the first cell 72a is released into the exhaust as hydrogen without reacting with the $NO_X$. Therefore, in the third cell 72c, energy is consumed for producing protons not reacting with the $NO_X$, and therefore the fuel efficiency may be deteriorated.

On the other hand, in the reactor 45 according to the present embodiment, the upstream side partial honeycomb member 71a and the downstream side partial honeycomb member 71b have the insulating spacers 91 provided between them. Due to this, protons formed at the third cell 72c are kept from moving to the first cell 72a. Accordingly, at the first cell 72a, part of the protons is kept from being discharged as hydrogen into the exhaust gas without reacting with the $NO_X$. As a result, deterioration of the fuel consumption can be suppressed.

The invention claimed is:

1. An electrochemical reactor arranged in an exhaust passage of an internal combustion engine, wherein the electrochemical reactor comprises a honeycomb member at which a plurality of cells are formed, the honeycomb member comprising an upstream side partial honeycomb member and a downstream side partial honeycomb member arranged at a downstream side from the upstream side partial honeycomb member in the direction of exhaust flow;

the upstream side partial honeycomb member comprises a plurality of first cells and a plurality of second cells arranged so as to at least partially adjoin the first cells through partition wall base members including an ion conductive solid electrolyte, a cathode layer being provided on the surface of the partition wall base members defining the first cells and an anode layer being provided on the surface of the partition wall base member defining the second cells;

the downstream side partial honeycomb member comprises a plurality of third cells and a plurality of fourth cells arranged so as to at least partially adjoin the third cells through partition wall base members including an ion conductive solid electrolyte, an anode layer being provided on the surface of the partition wall base members defining the third cells and a cathode layer being provided on the surface of the partition wall base members defining the fourth cells; and the electrochemical reactor is configured so that all of the exhaust gas flowing through the first cells flows into the third cells and all of the exhaust gas flowing through the second cells flows into the fourth cells.

2. The electrochemical reactor according to claim 1, wherein the upstream side partial honeycomb member and the downstream side partial honeycomb member are joined together at the partition wall base members, and the cathode layer of the first cell and the anode layer of the third cell are arranged so as to be separated from each other in the direction of exhaust flow so as not to contact each other and the anode layer of the second cell and the cathode layer of the fourth cell are arranged so as to be separated from each other in the direction of exhaust flow so as not to contact each other.

3. The electrochemical reactor according to claim 1, wherein the honeycomb member comprises spacers formed by a material with a lower ion conductivity compared with the solid electrolyte, between the upstream side partial honeycomb member and the downstream side partial honeycomb member.

4. The electrochemical reactor according to claim 1, wherein the cells of the honeycomb member are configured to have rectangular shape cross-sections, and the honeycomb member is formed so that one first cell adjoins four second cells in the four directions and one second cell adjoins four first cells in the four directions, and is formed so that one third cell adjoins four fourth cells in the four directions and one fourth cell adjoins four third cells in the four directions.

* * * * *